United States Patent [19]

Grims

[11] Patent Number: 4,533,039

[45] Date of Patent: Aug. 6, 1985

[54] DEFLECTABLE PIN ASSEMBLY

[75] Inventor: Conrad M. Grims, Golden, Colo.

[73] Assignee: Adolph Coors Company, Golden, Colo.

[21] Appl. No.: 530,506

[22] Filed: Sep. 9, 1983

[51] Int. Cl.³ .............................................. B65G 47/84
[52] U.S. Cl. .................................... 198/651; 198/645; 198/719
[58] Field of Search ............... 198/648, 651, 731, 645, 198/719; 403/229

[56] References Cited

U.S. PATENT DOCUMENTS 2,477,827 11/1947 Robinson ............................ 403/229
2,546,026  4/1947 Coon .................................... 403/229
4,129,206 12/1978 Talbott ............................. 198/651 X
4,388,990  6/1983 Michalik ............................. 198/719

*Primary Examiner*—Joseph E. Valenza
*Assistant Examiner*—Michael Stone
*Attorney, Agent, or Firm*—Klaas & Law

[57] ABSTRACT

A deflectable pin assembly mountable on a conveyor chain for use in transporting open ended containers comprising a first elongate sleeve for supporting an open ended container thereon; a second elongate sleeve for mounting the deflectable pin assembly on a conveyor chain; connection apparatus for seating and pivotally connecting the first elongate sleeve and the second elongate sleeve; a biasing device for biasing the first sleeve in a predetermined position relative the second sleeve; the pin assembly having a biased position wherein the first sleeve is positioned in substantially coaxial relationship with the second sleeve, and having a plurality of deflected positions wherein the first sleeve is positioned in obtuse angular relationship relative the second sleeve.

12 Claims, 6 Drawing Figures

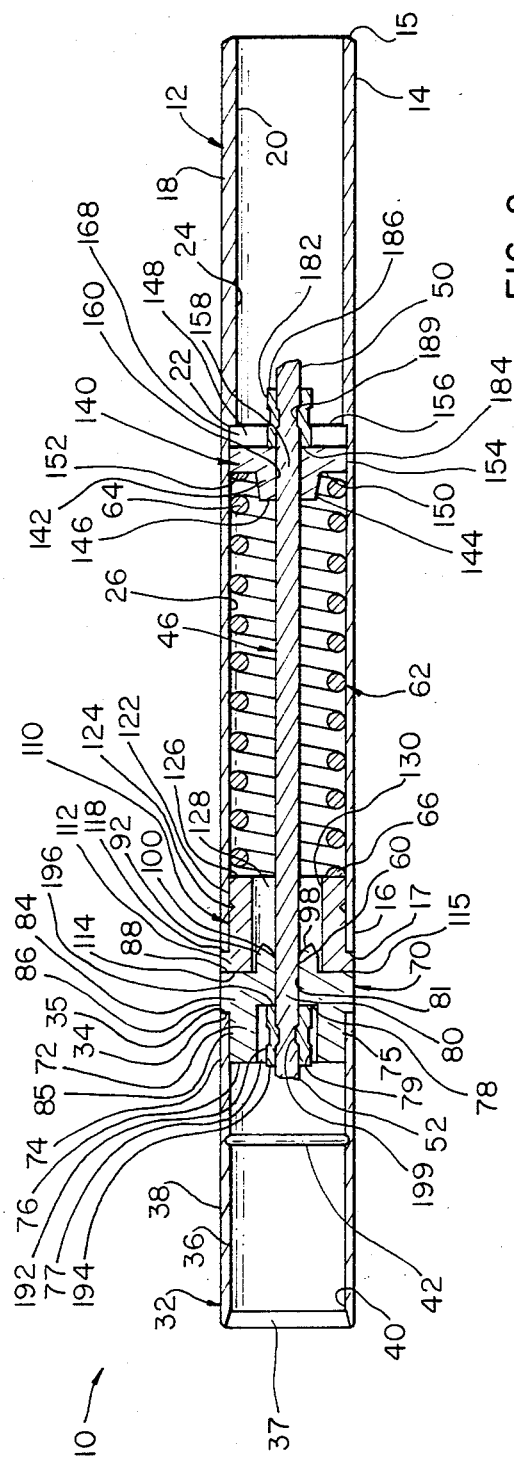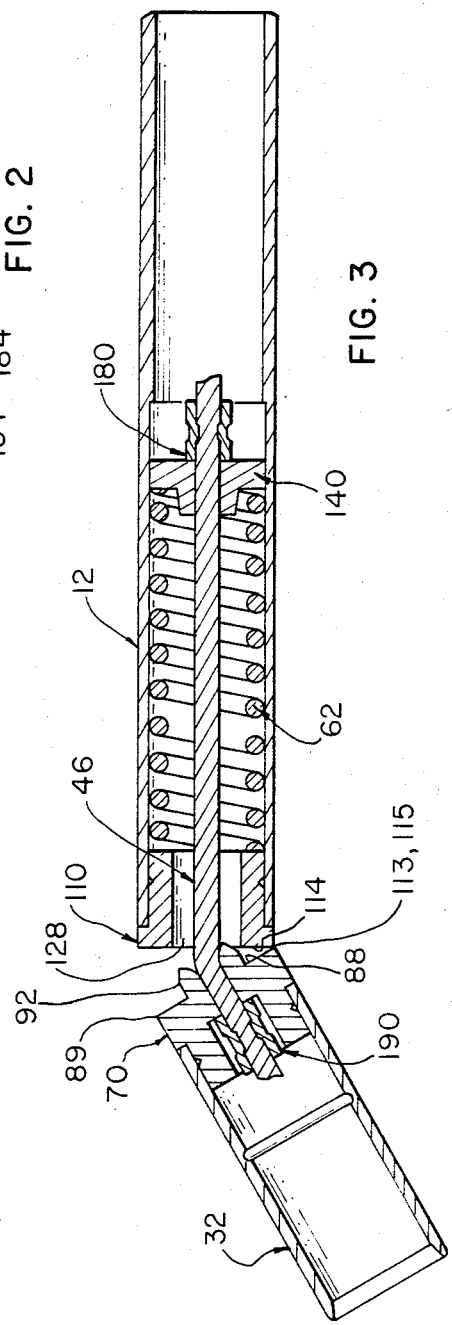

DEFLECTABLE PIN ASSEMBLY

BACKGROUND OF THE INVENTION

The present invention relates generally to container conveying systems and more particularly to a conveying system for open-ended containers utilizing a plurality of pins extending outwardly from a continuous conveyor chain powered by a chain drive.

In automated food and beverage packaging, many different conveyor systems may be used in a series of operational steps in decorating containers prior to insertion of a food product and sealing of the containers. One application for which the present invention is particularly suited is that of can decorating. In a typical can decorating operation, cylindrical cans having one open end are fed into a high speed, continuous can printer which prints ink images onto the cylindrical outer surfaces of the cans. After printing, the cans follow a circular path of travel at the periphery of a mandrel wheel. Transfer devices such as suction cups or the like are mounted on a transfer wheel which is provided at a location proximate the mandrel wheel. The transfer devices are used to transfer the cans from the mandrel wheel to a plurality of pin assemblies provided in spaced apart relationship on a pin conveyor chain. One such pin assembly enters each can while it is supported on the transfer wheel. Upon removal of suction from the transfer wheel suction cups, the pin assemblies support the associated cans received thereon and convey the cans away from the transfer wheel and through a drying oven or other remote area for further handling and processing. Such can decorating systems are well known in the art and are described in Sirvet U.S. Pat. No. 4,037,530 issued July 26, 1977; Talbott U.S. Pat. No. 4,129,206 issued Dec. 12, 1978; McMillin et al, U.S. Pat. No. 4,138,941 issued Feb. 13, 1979; and Stirbis U.S. Pat. No. 4,267,771 issued May 19, 1981, all of which are hereby incorporated by reference.

A problem with pin assemblies used on such pin conveyor chains in the past has been that the pin assemblies, in order to prevent damage to the conveyor chain, have been constructed so as to break when encountering an obstruction. When such pin breakage occurs, especially if a series of pins are broken, the conveyor chain must be stopped and the broken pins must be replaced.

Such repairs maybe very costly in terms of lost production time of the can decorating system. Such systems generally run at speeds on the order of 500 to 1000 cans per minute and thus a down time of even a few hours is extremely expensive. Replacement of such broken pins may be costly in terms of material and labor needed to perform the maintenance operation.

It would be generally desirable to provide a pin assembly which would reduce system maintenance expense and operating expense by providing essentially maintenance-free operation. Such a pin assembly should be capable of stably supporting cans or other open-ended containers under all normal operating conditions. The pin assemblies should be deflectable, however, when encountering a fixed obstruction in order to allow the pin chain to continue operating without damage to either the pin assembly or the conveyor chain. The pin assemblies should further be self-seating so that after initial deflection the pins resume the normal can carrying configuration.

SUMMARY OF THE INVENTION

The present invention comprises a deflectable pin assembly capable of supporting open-ended containers on a continuous conveyor chain. A portion of the pin assembly is deflectable relative the conveyor chain upon encountering an obstructing condition and resumes a normal seated can supporting configuration subsequent to clearing the obstruction without need for manual resetting or repair.

The deflectable pin assembly comprises a first elongate sleeve means having a forward end and a rear end for supporting an open-ended container thereon; a second elongate sleeve means having a forward end and a rear end for mounting the deflectable pin assembly on a conveyor chain; connection means for seating and pivotally connecting the first elongate sleeve means and the second elongate sleeve means; biasing means for biasing the position the first sleeve means in a predetermined position relative the second sleeve means. The pin assembly has a biased position wherein the first sleeve means is positioned in a seated substantially coaxial relationship with the second sleeve means, and a plurality of deflected positions wherein the first sleeve means is positioned in obtuse angular relationship relative the second sleeve means.

BRIEF DESCRIPTION OF THE DRAWING

FIG. 2 is a cross sectional view of a deflectable pin assembly in a seated position;

FIG. 3 is a cross sectional view of a deflectable pin assembly in a deflected position;

DETAILED DESCRIPTION OF THE DRAWING

Figure 6:
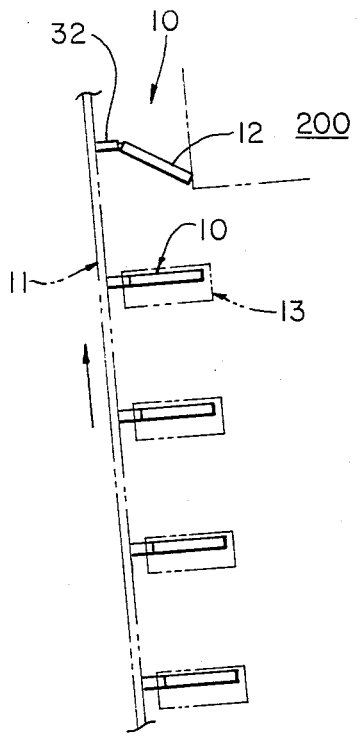
FIG. 6 is schematic view illustrating the use of a deflectable pin assembly on a moving conveyor chain.

As illustrated in FIG. 6 the deflectable pin assembly 10 of the present invention is mounted on a conveyor chain 11 and is used to convey hollow open-ended objects such as open-ended container cans 13 which are vertically supported by the pin assembly 10.

Figure 1:
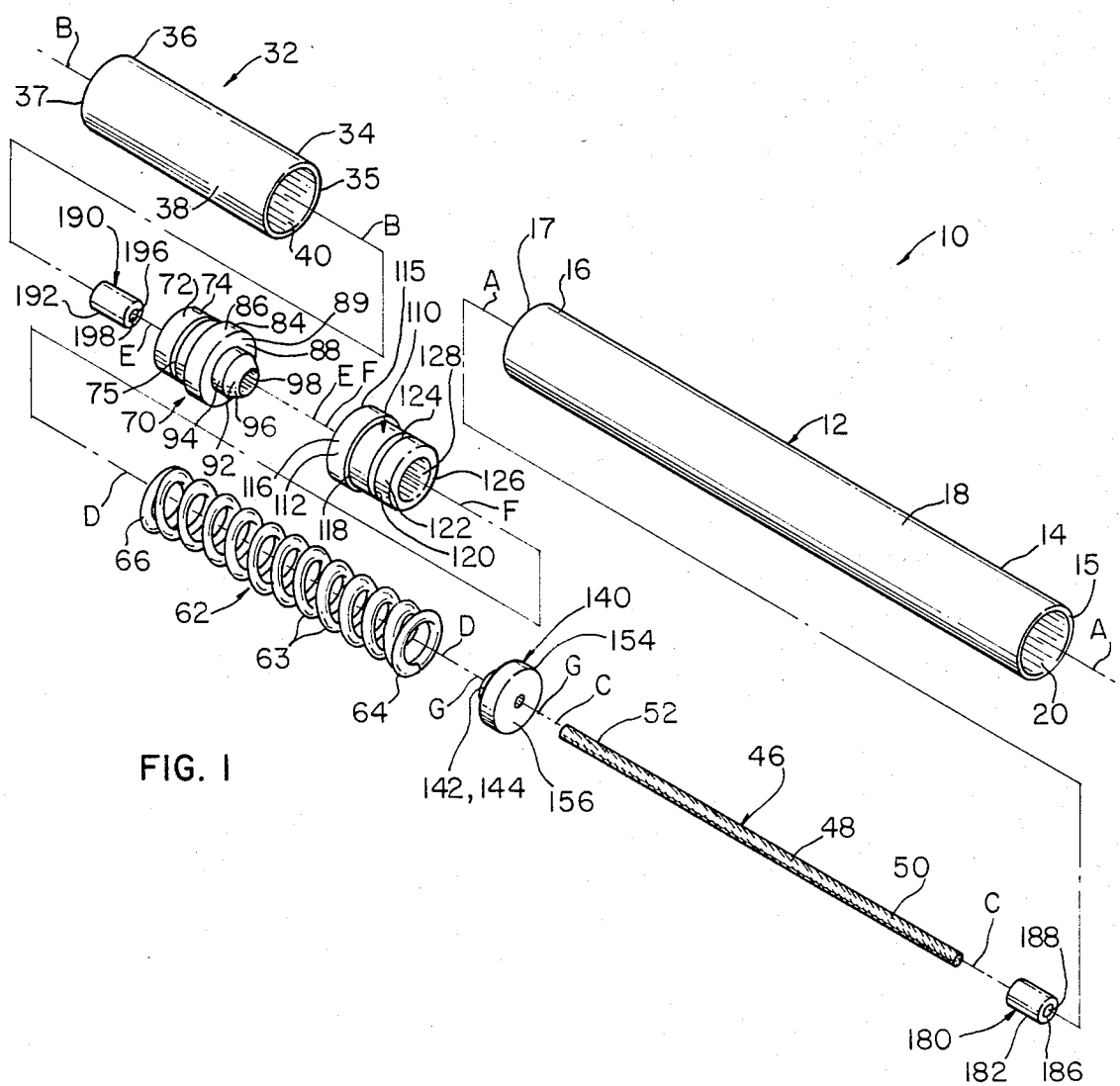
FIG. 1 is an exploded perspective view of a deflectable pin assembly.

Referring to FIGS. 1, 2 and 3, it may be seen that the deflectable pin assembly 10 in general comprises a forward elongate sleeve means 12 which supports a container 13 on a circumferential portion thereof; a rear elongate sleeve means 32 which is fixedly attached to the conveyor chain 11 at the rear end thereof and which is pivotally hinged at the forward end thereof to the rear end of the forward sleeve means 12. The seating of the forward sleeve means 12 on the rear sleeve means 32, as illustrated in FIG. 2, and the pivotal deflectability of the forward sleeve means 12 relative the rear sleeve means 32, as illustrated in FIG. 3, is made possible by a connection means. The connection means includes a seating means consisting of a rear plug means 70 rigidly attached to the forward end of the rear elongate sleeve means 32 and a forward plug means 110 rigidly attached to the rear end of the forward elongate sleeve means 12. A nipple means 92 on the rear plug means 70 is insertable into a central bore 128 on the forward plug means 110. A radially extending surface 88 on the rear plug means which intersects the nipple means 92 contacts a rear radially extending surface 114 on the forward plug means. The two surfaces 88, 114 are positioned in planar abutting contact when the two sleeve means are positioned in the seated relationship shown in FIG. 2. The two surfaces 88, 114 are positioned in angled relationship, with a circumferential edge portion of surface 114 contacting and pivoting on surface 88, when the forward elongate sleeve means 12 is deflected as shown in FIG. 3. An elongate flexible cable means 46 extends through central bores in the forward and rear plug means 70, 110 and is restrained from moving forwardly with respect to the rear plug means by a restraining means such as rear end ferrule 190. The forward end of the cable means passes through a central bore in a spring retainer means 140 and is restrained from moving rearwardly relative the spring retainer means by a restraining means such as forward end ferrule 180. A resilient biasing means such as elongate coil spring 62, positioned in circumscribing relationship about an intermediate portion of the cable means and in turn enclosed within the forward sleeve means 12, is positioned between rear plug means 110 and spring retainer means 140 and coacts therewith to urge surface 88 of rear plug means 70 against surface 114 of forward plug means 110 thus biasing forward sleeve means 12 into the seated relationship with rear sleeve means 30 illustrated in FIG. 2. The length of the cable means 46 and the arrangement of end ferrules 180, 190 are such that the cable means 46 is stretched to its full length in a state of tension when the pin assembly is in a seated state. A laterally directed force of sufficient magnitude applied to forward sleeve means 12 causes forward sleeve means 12 to deflect relative rear sleeve means 32. Such a deflection force causes the forward sleeve means to deflect about a pivot point 113 on forward plug means rear peripheral edge 115. The pivot point 113 is positioned near the forward peripheral edge 89 of the rear plug means 70. The pivot point 113 is thus radially displaced a small distance X from the coaxial longitudinal central axes AA, FF, of forward sleeve means 12 and rigidly connected forward plug means 110 and form central axis CC of cable means 46. Cable means 46, as a result of deflection of sleeve means 12 about a pivot point offset from central axis CC, is urged rearwardly relative forward sleeve means 12 and transmits a rearwardly directed reaction force to retainer 140. Retainer 140 transmits the rearward reaction force to spring 62 which compresses and in turn transmits the rearward reaction force to rear plug means 110. The rearward reaction force thus transmitted has a force vector directed essentially along the central axis CC of cable means 46 producing reaction torque about pivot point 113. The reaction torque has a moment arm substantially equal to the radial distance between point 113 and cable means 46. When the deflection force on sleeve means 12 is removed the reaction force torque is unresisted. This torque angularly accelerates forward sleeve means 12 about pivot point 113 causing it to pivot inwardly and to resume its biased position in coaxial alignment with rear sleeve means 32. Thus, when a lateral deflection force of sufficient magnitude to cause compression of elongate coil spring 62 is exerted on forward sleeve means 12, it deflects angularly relative rear sleeve means 32. When this lateral force is removed, forward sleeve means 12 will resume its coaxial alignment with rear sleeve means 32. This pivotal motion is facilitated by the coaction of forward plug means bore 128 and nipple means 92 which is forwardly, inwardly beveled at a forward portion of the outer circumference thereof to allow pivotal movement relative bore 128, sidewall 130. A rear portion of nipple means 92 is cylindrical and accepts bore 128 in relatively close relationship thereabout when the pin assembly is in the seated position, thus providing proper alignment of the two sleeve means. However, the cylindrical rear portion of the nipple means is sufficiently short and sufficiently smaller in diameter than bore 128 to allow pivotal movement between the two plug means 70, 110.

Having thus described the invention in general terms, the components of the invention of the preferred embodiment will now be described more specifically. It may be seen from FIGS. 1, 2 and 3 that the invention comprises a forward elongate cylindrical sleeve means 12 with a longitudinal axis AA having a forward end 14 terminating in a forward radially extending edge surface 15 and a rear end 16 terminating in a rear radially extending edge surface 17 and having an outer cylindrical wall surface 18 extending between edge surfaces 15 and 17. Forward sleeve means 12 also comprises an inner cylindrical wall surface 20, FIG. 2 having an inner wall shoulder with a radially extending surface portion 22 which restrains forward movement of retainer means 140 as further described below. The inner wall shoulder is formed by the intersection of a forward smaller diameter inner wall portion 24 and a rearward larger diameter inner wall portion 26.

A second elongate sleeve means having a central longitudinal axis BB extending between its forward end 34 and rear end 36 terminates at a radially extending forward edge surface 35 and an inwardly beveled rear edge surface 37. The second elongate sleeve means may have an outer cylindrical wall surface 38 having a diameter substantially equal to the diameter of forward elongate sleeve means outer wall surface 18 and may have an inner cylindrical wall surface 40 having a diameter substantially equal to larger inner wall portion 26 of forward sleeve means 12. A relatively small width annular groove 42 may be provided in inner cylindrical wall surface 40 to facilitate attachment of the rear sleeve means to a conveyor chain 11 as illustrated in FIG. 6. In a typical application, the forward and rear sleeve means 12, 32 may be constructed from a 20 gauge by 0.56 inch outside diameter DOM tubing.

A flexible cable means 46 having a central longitudinal axis CC and a generally cylindrical outer surface 48 having a forward end 50 and rear end 52 is provided for holding the two sleeve members 12, 32 in a seated or pivotally deflected relationship as described above. The flexible cable means 46 is preferably a high-strength steel cable such as air craft 1/16th inch OD, 7-strand, cadmium-plated cable.

The invention comprises a biasing means such as elongate coil spring means 62 having a central longitudinal axis DD positioned in coaxial alignment with forward sleeve central longitudinal axis AA. The coil spring means 62 comprises a plurality of spring coils 63 terminating in a forward end coil 64 and a rear end coil 66.

A rear plug means 70 with a central longitudinal axis EE is provided in fixed attachment to rear sleeve means 32. Rear plug means 70 has a rear cylindrical portion 72 with an axially extending cylindrical surface 74 having an annular groove 75 thereabout. The rear cylindrical portion 72 also comprises a rear radially extending surface 76 having a circular bore 77 therein which is in coaxial alignment with central longitudinal axis EE. The bore 77 in turn comprises a radially extending surface 78 and an axially extending wall surface 79. A second bore 80 having a cylindrical wall surface 81 intersects and extends forwardly from bore 77 in coaxial alignment therewith. The radius of the second bore 80 may be slightly larger than the radius of cable means 46. The radius of the first bore 77 is substantially larger than bore 80 and is adapted to receive end ferrule 190 therein as discussed in further detail hereinafter. The forward plug means 70 also comprises a forward cylindrical portion 84 through which bore 80 extends. The forward cylindrical portion 84 comprises a rear radially extending surface 85 which intersects surface 74 thereby defining a shoulder for receiving an inner wall surface portion of rear sleeve means 32 in tight abutting relationship therewith. In a preferred embodiment, the connection of the forward end 34 of rear sleeve means 32 with surfaces 74, 85 is provided by a 0.001 inch press fit augmented by the use of a high strength metal adhesive such as epoxy or the like. The function of groove 75 is to retain the adhesive. The outer surface 86 of forward cylindrical portion 84 is preferably of a diameter equal to that of rear sleeve outer surface 38. Forward cylindrical portion 84 also comprises a forward radially extending surface 88 integrally connected with a centrally positioned forwardly extending nipple means 92 having an cylindrical outer surface portion 94 and a forwardly inwardly beveled outer surface portion 96 which may comprise a truncated cone configuration intersecting surface portion 94 at an angle of substantially 135°. Nipple means 92 also comprises a rounded, funnel shaped, inner surface 98 which intersects the side walls 81 of bore 80. The rounded shape of inner surface 98 prevents abrasion and surface scoring of cable means 46 during periods of deflection of the cable means from a coaxial alignment with the rear sleeve means 32.

The invention also comprises a forward plug means 110 which cooperates with the rear plug means 70 to provide seating and pivotal movement for the two sleeve means 12, 32. The forward plug means 110 has a central longitudinal axis FF and comprises a rear cylindrical portion 112 having a rear radially extending surface 114, an axially extending cylindrical surface 116 and a forward radially extending surface 118. The forward plug means also comprises a forward cylindrical portion 120 having an axially extending cylindrical surface 122 intersecting surface 118 and having an annular groove 124 positioned thereabout. The function of groove 124 is the same as that of groove 75 described above. The forward cylindrical portion 120 terminates in a radially extending surface 126 having a central bore 128 positioned in coaxial alignment with the central longitudinal axis FF of forward plug means 110. The central bore 128 comprises a cylindrical side wall 130 which is positionable in close annular relationship (e.g. 0.002 inch annular clearance) with nipple means outer cylindrical surface 94. In the preferred embodiment, the nipple means extends inwardly into bore 128 a distance of approximately 0.125 inches, with portion 94 extending approximately 0.062 inches. Rear radially extending surface 114 of forward plug means 110 extends in mirror image relationship with forward radially extending surface 88 of rear plug means 70 in abutting contact therewith when the two sleeve means 12, 32 are positioned in coaxial alignment. When sleeve means 12 is deflected relative to sleeve means 32 a portion of circular peripheral edge 115 defined by the intersection of surfaces 112 and 114 pivots on an outer portion 89 of surface 88. In FIG. 3 this pivot point is shown at 113. Forward plug means surfaces 118, 122 engage a rear edge 17 and inner wall 26 portion of forward sleeve means 12, in the same manner as described above with respect to the attachment of rear plug means 70 and rear sleeve means 32. Forward plug means forward most radially extending surface 126 engages a portion of rear most spring coil 66 in abutting contact therewith.

The invention also comprises a spring retainer means 140 having a rear portion 142 with an inwardly rearwardly extending truncated conical surface 144 and a radially extending surface 146. Spring retainer means 140 also comprises a forward portion 148 having a rear radially extending surface 150 which abuttingly engages a forward most spring coil 64 thereon and which further comprises an axially extending cylindrical surface 154 having a diameter slightly smaller than the diameter of inner wall portion 26 to allow sliding movement of the spring retainer means 140 therewithin. The spring retainer means also comprises a forward radially extending surface 156 which, in the result of failure of the cable means, would engage abutment surface 22 at a peripheral portion thereof, thereby preventing discharge of the spring means or spring retainer means from end 20 of elongate sleeve means 12. An axial bore 158 having a cylindrical side wall 160 and positioned in coaxial alignment with the central longitudinal axis GG of spring retaining means 140 has a diameter slightly larger than cable means 46 which extends therethrough.

The invention also comprises cable end retaining means such as forward and rear ferrule means 180, 190 comprising respectively cylindrical outer surfaces 182, 192; rear axially extending surfaces 184, 194; forward axially extending surfaces 186, 196; and having central bores 188, 198 with cylindrical side walls 189, 199 extending therethrough. The bores 188, 198 are of a diameter slightly larger than cable means 46 allowing the cable to be inserted therethrough and thereafter rigidly attached to the bore side walls 189, 199, by crimping of the ferrule means thereto. In a preferred embodiment, the ferrule means comprise copper ferrules.

In a typical application, forward elongate sleeve means 12 comprises a length of 3.845 inches; rear elongate sleeve means 32 comprises a length of 1.468 inches; forward plug means 110 comprises a length of 0.437 inches; rear plug means 70 comprises a length of 0.500 inches; cable means 46 comprises a length of approximately 2.500 inches; spring means 62 comprises a length of 1.500 inches having a spring constant of 120 pounds/inch; retainer means 140 comprises a length of 0.156 inches; ferrule means 180, 190 comprises a length of 0.125 inches.

To assemble the deflectable pin assembly 10 a strand of cable 46 is cut to a predetermined length slightly longer than the finished length. For example, the cable may be cut to a length equal to the sum of the lengths of the two sleeve means 12, 32.

Figure 4:
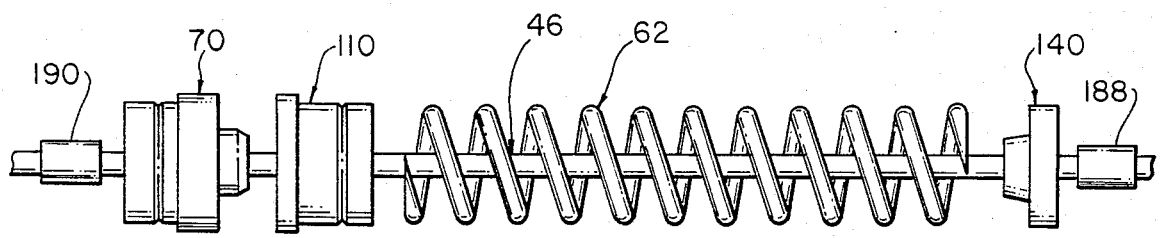
FIG. 4 is an elevation view of a sub assembly of a deflectable pin assembly.
Figure 5:
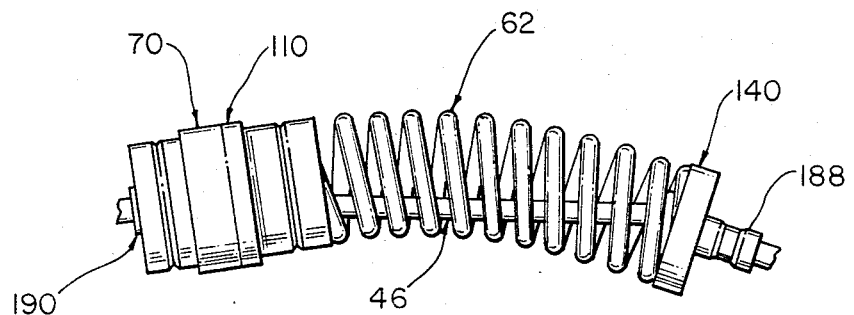
FIG. 5 is an elevation view of the deflectable pin assembly sub assembly of FIG. 4 in a compressed configuration.

The components of the deflectable pin assembly 10, except for the two sleeve means 12, 32, are then positioned in circumscribing relationship about the cable means 46 in the following order as illustrated in FIG. 4: first end ferrule means 190 then rear plug means 70, then forward plug means 110, then spring means 62, then spring retainer means 140, then ferrule means 188. The above described components are then formed into a preassembly unit by first crimping rear ferrule means 190 into fixed relationship with cable means 140, then urging all the components into abutting engagement, then further urging spring retainer means 140 and forward end ferrule 188 rearwardly to slightly compress spring means 62, for example by compressing it 0.25 inches; then fixedly crimping forward ferrule means 188 into fixed relationship with cable means 46; then cutting off the cable excess at points slightly remote from the two end ferrule means 188, 190, thus providing the preassembly unit illustrated by FIG. 5. The preassembly unit is next attached to one of the sleeve means 12, 32 as by the press fitting and/or epoxying described above, then the preassembly is attached to the remaining of the sleeve means 12, 32 in the same manner. Thus, a deflectable pin assembly 10 having a spring biased normally seated position as illustrated in FIG. 2 and being deflectable by a lateral force of sufficient magnitude to a position such as illustrated by FIG. 3 is formed. As illustrated by FIG. 6, the deflectable configuration allows the deflectable pin assembly 10 to deflect such as when encountering an object 200 that has been inadvertently positioned in interfering relationship with a can conveying system. Such a deflectable arrangement allows the conveying assembly to continue to operate without need for shut-down, repair and replacement of the pin assembly 10, thus considerably reducing system operating and maintenance costs.

It is contemplated that the inventive concepts herein described may be variously otherwise embodied and it is intended that the appended claims be construed to include alternative embodiments of the invention except insofar as limited by the prior art.

What is claimed is:

1. A deflectable pin assembly mountable on a conveyor chain for use in transporting open ended containers comprising:
   a. first elongate sleeve means having a forward end and a rear end for supporting an open ended container thereon;
   b. second elongate sleeve means having a forward end and a rear end for mounting said deflectable pin assembly on a conveyor chain;
   c. connection means for seating and pivotally connecting said first elongate sleeve means and said second elongate sleeve means; wherein said connection means comprises:
   cable means for transmitting force from said biasing means for urging said rear end of said first sleeve means toward said forward end of said second sleeve means;
   cable connection means for connecting said cable means in force transmitting relationship with said first and second sleeve means;
   seating means for seating said rear end of said first sleeve means in opposed coaxial relationship with said forward end of said second sleeve means;
   d. biasing means for biasing said first sleeve means in a predetermined position relative said second sleeve means;
   e. said pin assembly having a biased position wherein said first sleeve means is positioned in substantially coaxial relationship with said second sleeve means, and
   said pin assembly having a plurality of deflected positions wherein said first sleeve means is positioned in obtuse angular relationship relative said second sleeve means.

2. A deflectable pin assembly mountable on a conveyor chain for use in transporting open ended containers comprising:
   a. first elongate sleeve means having a forward end and a rear end for supporting an open ended container thereon;
   b. second elongate sleeve means having a forward end and a rear end for mounting said deflectable pin assembly on a conveyor chain;
   c. connection means for seating and pivotally connecting said first elongate sleeve means and said second elongate sleeve means;
   d. biasing means for biasing said first sleeve means in a predetermined position relative said second sleeve means; wherein said biasing means comprises spring means mounted within one of said first sleeve means and said second sleeve means;
   e. said pin assembly having a biased position wherein said first sleeve mens is positioned in substantially coaxial relationship with said second sleeve means, and said pin assembly having a plurality of deflected positions wherein said first sleeve means is positioned in obtuse angular relationship relative said second sleeve means.

3. The invention of claim 2 wherein said biasing means comprises spring means mounted within one of said first sleeve means and said second sleeve means wherein said spring means cooperates with said cable means to place said cable means in a continuous state of tension.

4. The invention of claim 3 wherein said seating means comprises:
   first plug means fixedly mounted at one of said forward end of said second sleeve means and said rear end of said first sleeve means, said first plug means having a raised centrally positioned nipple means thereon extending axially outwardly of said sleeve means on which it is mounted and having a circular shoulder portion;
   second plug means fixedly mounted at the one of said forward end of said second sleeve means and said rear end of said first sleeve means not having said first plug means mounted thereon, said second plug means comprising an annular bearing surface thereon adapted to be received in abutting relationship with said circular shoulder portion of said first sleeve means.

5. The invention of claim 4 wherein said nipple means portion comprises an inwardly tapered outer wall portion for allowing pivotal displacement of said first plug means relative said second plug means when a surface of said first plug means is pivotally supporting an edge portion of said second plug means.

6. The invention of claim 2, said first elongate sleeve means comprising:
   a central longitudinal axis and having said forward end terminating in a forward radially extending edge surface and said rear end terminating in a rear radially extending edge surface and having an outer cylindrical wall surface extending between said forward and rear edge surfaces; and having an inner cylindrical wall surface having an inner wall shoulder with a radially extending surface portion extending between a forward smaller diameter inner wall portion and a rearward larger diameter inner wall portion.

7. The invention of claim 6, said second elongate sleeve means comprising:

a central longitudinal axis extending between said forward end and said rear end, said forward end terminating at a radially extending forward edge surface said rear end terminating at an inwardly beveled rear edge surface and having an outer cylindrical wall surface extending between said terminal edge surfaces with a diameter substantially equal to the diameter of said forward elongate sleeve means outer cylindrical wall surface, and having an inner cylindrical wall surface with a diameter substantially equal to said larger inner wall portion of said first sleeve means.

8. The invention of claim 7, said connection means comprising:
a flexible cable means having a central longitudinal axis and a generally cylindrical outer surface and having a forward end and rear end.

9. The invention of claim 7, said biasing means comprising:
elongate coil spring means having a central longitudinal axis positioned in coaxial alignment with said first sleeve means central longitudinal axis; said coil spring means comprising a plurality of spring coils terminating in a forward end coil and a rear end coil.

10. The invention of claim 9 wherein said connection means further comprises:
a first plug means fixedly mounted in said rear end of said first sleeve means which cooperates with a second plug means fixedly mounted in said forward end of said second sleeve means to provide seating and relative pivotal movement between said two sleeve means, said first plug means having a central longitudinal axis aligned with said central longitudinal axis of said first sleeve means and comprising a rear cylindrical portion having a rear radially extending surface, an axially extending cylindrical surface and a forward radially extending surface; and a forward cylindrical portion having an axially extending cylindrical surface intersecting said radially extending surfaces of said rear cylindrical portion, said forward cylindrical portion terminating in a radially extending surface and abuttingly engaging said spring means rear end coil; said first plug means having a central bore extending therethrough and positioned in coaxial alignment with said central longitudinal axis of said first plug means; and
second plug means having a central longitudinal axis positioned in coaxial alignment with said second elongate sleeve means, said second plug means comprising a rear cylindrical portion with an axially extending cylindrical surface and a rear radially extending surface and having a first central bore therein positioned in coaxial alignment with said second plug means central longitudinal axis; said central bore comprising a radially extending wall surface and a forward axially extending wall surface; said second plug means having a second central bore with a cylindrical wall surface intersecting and extending forwardly from said first central bore in coaxial alignment therewith, the radius of said second central bore being slightly larger than the radius of said cable means whereby said cable means is receivable therein, the radius of the said first central bore being substantially larger than said second central bore and being adapted to receive end ferrule means therein; said second plug means also comprises a forward cylindrical portion through which said second central bore extends, said forward cylindrical portion comprising a rear radially extending surface intersecting said rear cylindrical portion axially extending surface and defining a shoulder for receiving an inner wall surface portion of said rear sleeve means in tight abutting relationship therewith; said forward cylindrical portion further comprising a forward radially extending surface integrally connected with a centrally positioned forwardly extending nipple means having a cylindrical outer surface portion and a forwardly inwardly beveled outer surface portion and a rounded, funnel shaped, inner surface which intersects said second central bore, said rounded shape of said inner nipple surface preventing abrasion and surface scoring of said cable means;
said nipple means extending inwardly into said first plug means central bore and said rear radially extending surface of said first plug means extending in mirror image relationship with said forward radially extending surface of said rear plug means in abutting contact therewith when said two sleeve means are positioned in coaxial alignment;
a portion of a circular peripheral edge defined by the intersection of said first plug means rear portion radially and axially extending surfaces being pivotal on an outer portion of said forward radially extending surface of said rear plug means surface when said first sleeve means is deflected relative to said second sleeve means.

11. The invention of claim 10 further comprising:
a spring retainer means having a rear portion, adapted to receive said spring means thereabout, with an inwardly rearwardly extending truncated conical surface and a radially extending surface and a forward portion having a rear radially extending surface which abuttingly engages a forward most spring coil and which further comprises an axially extending cylindrical surface having a diameter slightly smaller than the diameter of said first elongate sleeve means inner wall portion allowing sliding movement of said spring retainer means therewithin;
said spring retainer means having an axial bore positioned in coaxial alignment with said central longitudinal axis thereof and having a diameter slightly larger than the diameter of said cable means, said cable means extending therethrough.

12. The invention of claim 11 comprising:
cable end retaining forward and rear ferrule means rigidly attachable to said cable means by crimping of the ferrule means thereto;
said forward and rear end ferrule means being positioned on said cable means at predetermined positions providing a predetermined amount of compression of said spring means.

* * * * *